United States Patent [19]
Ogasawara

[11] Patent Number: 6,091,972
[45] Date of Patent: Jul. 18, 2000

[54] MOBILE COMMUNICATION UNIT

[75] Inventor: Shinichi Ogasawara, Kanagawa, Japan

[73] Assignee: Sony Corporation, Tokyo, Japan

[21] Appl. No.: 09/012,194

[22] Filed: Jan. 23, 1998

[30] Foreign Application Priority Data

Feb. 10, 1997 [JP] Japan .................................. 9-026891

[51] Int. Cl.[7] ..................................................... H04B 1/38
[52] U.S. Cl. .............................................. 455/575; 455/90
[58] Field of Search ............................ 455/422, 66, 550,
455/572, 575, 90, 95, 97, 128, 129, 347,
351, FOR 100, 121; 379/433; 343/702;
D14/116, 138

[56] References Cited

U.S. PATENT DOCUMENTS

| | | | |
|---|---|---|---|
| 5,065,003 | 11/1991 | Wakatsuki et al. | D14/116 |
| 5,197,091 | 3/1993 | Takagi et al. | 379/433 |
| 5,335,367 | 8/1994 | Adachi et al. | 455/90 |
| 5,446,789 | 8/1995 | Loy et al. | 379/433 |
| 5,898,933 | 4/1999 | Kaschke | 455/575 |

*Primary Examiner*—Reinhard J. Eisenzopf
*Assistant Examiner*—Marsha D. Banks-Harold
*Attorney, Agent, or Firm*—Jay H. Maioli

[57] ABSTRACT

A miniaturized mobile communication unit in which the durability of the antenna is increased and the communication unit is set in a communicating state immediately by a user's operation. The mobile communication unit has a main unit. An antenna transmits and receives signals while being supported at its edge portion by the main unit and a sound receiver for receiving sound is attached to the antenna.

6 Claims, 6 Drawing Sheets

MOBILE COMMUNICATION UNIT

BACKGROUND OF THE INVENTION

1. Field of the Invention

The present invention relates to portable mobile communication units through which the user is able to perform communications.

2. Description of the Related Art

Mobile communication units, such as mobile cellular telephones and business-oriented or ham radio transceivers, are increasingly used. For example, mobile cellular telephones are configured in the following manner. A narrow antenna is accommodated within the upper part of the main unit of a cellular telephone. To perform a transmitting or receiving operation by using the cellular telephone, the user pulls up the antenna from the main unit with his/her fingers. In, for example, a two-piece folded cellular telephone, a display section provided for the main unit and an operation unit with a microphone are separately provided. The operation unit with a microphone is turned approximately 180 degrees from the display section, thereby causing the telephone to enter a communicating mode. Further, the antenna is configured so that the user is able to pull it up from the upper part of the main unit with his/her fingers.

Another type of mobile cellular telephone has a display section at the upper part of the main unit, operation buttons at the middle part of the unit, and a microphone at the lower part of the unit. In this type of telephone, as well as in the previous type, the user is required to pull up the antenna from the upper part of the main unit using his/her fingers.

In conventional mobile cellular telephones, as noted above, the antenna is placed at the upper part of the main unit, while the microphone is positioned at the lower part of the main unit. This inevitably increases the size of the mobile communication unit. Moreover, in known mobile cellular telephones, to perform a transmitting or receiving operation, the user is first required to pull up the antenna from the main unit and then to actuate the operating unit in order to make the telephone ready for use. Further, in conventional mobile cellular telephones, since a narrow antenna is adapted to be pulled up from the main unit for use, the durability of the antenna is low and vulnerable to bending.

SUMMARY OF THE INVENTION

Accordingly, in view of the above background, it is an object of the present invention to provide a miniaturized and highly durable mobile cellular telephone which is set to a transmitting and receiving state immediately by the user.

In order to achieve the above object, according to the present invention, there is provided a mobile communication unit comprising a main unit. An antenna transmits and receives signals while being supported at one edge portion by the main unit. A sound receiver for receiving sound is attached to the antenna.

DESCRIPTION OF THE PREFERRED EMBODIMENT

A detailed description will now be given of a preferred embodiment of the present invention with reference to the accompanying drawings.

Although technically preferable limitations are imposed on the following preferred embodiment of the present invention, the scope of the present invention is not restricted to the preferred embodiment unless otherwise stated in the following description.

Figure 1:
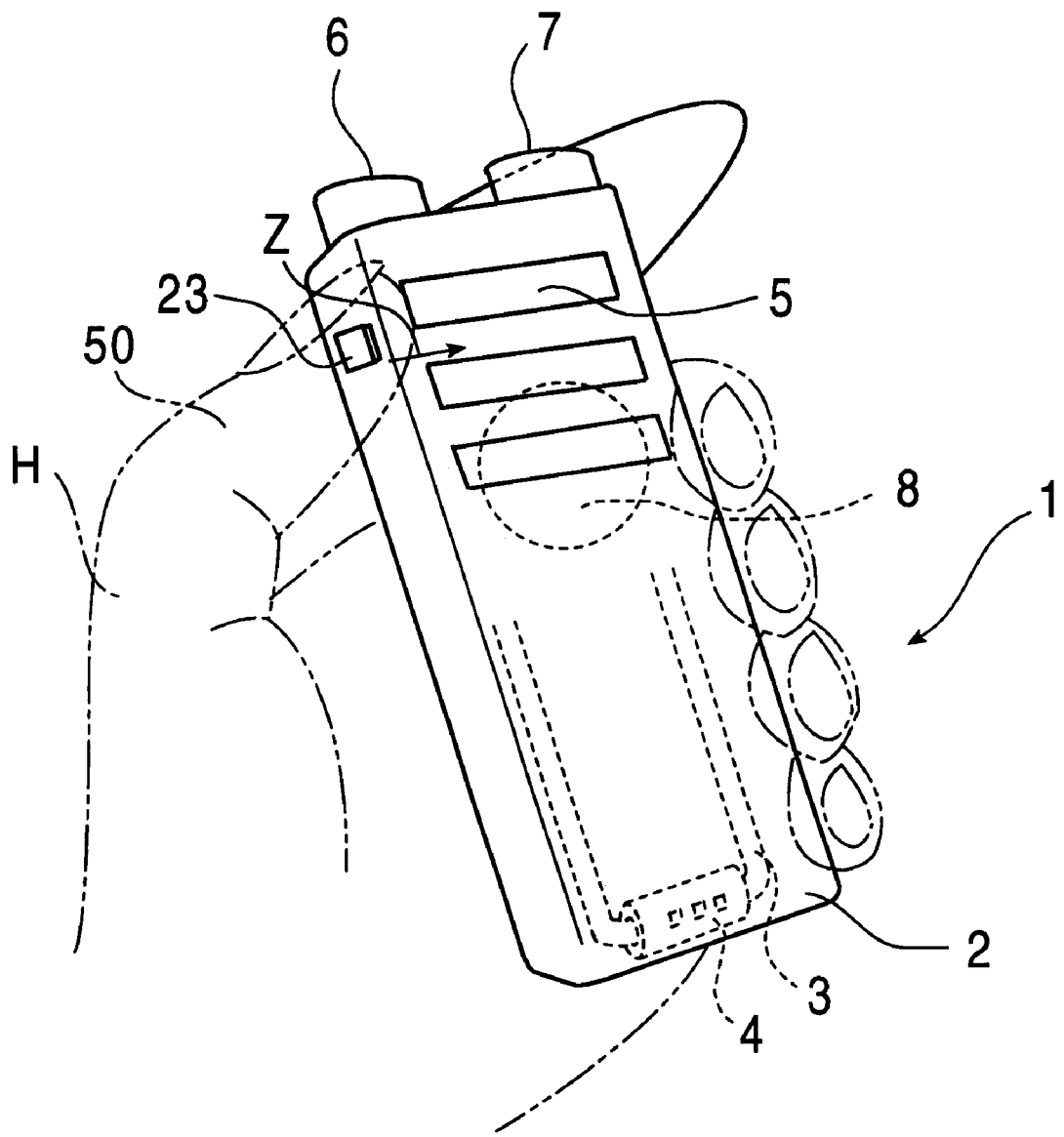
FIG. 1 is a perspective view illustrating a mobile communication unit when not in use in a state in which the antenna and the microphone are accommodated within the main unit according to a preferred embodiment of the present invention.
Figure 2:
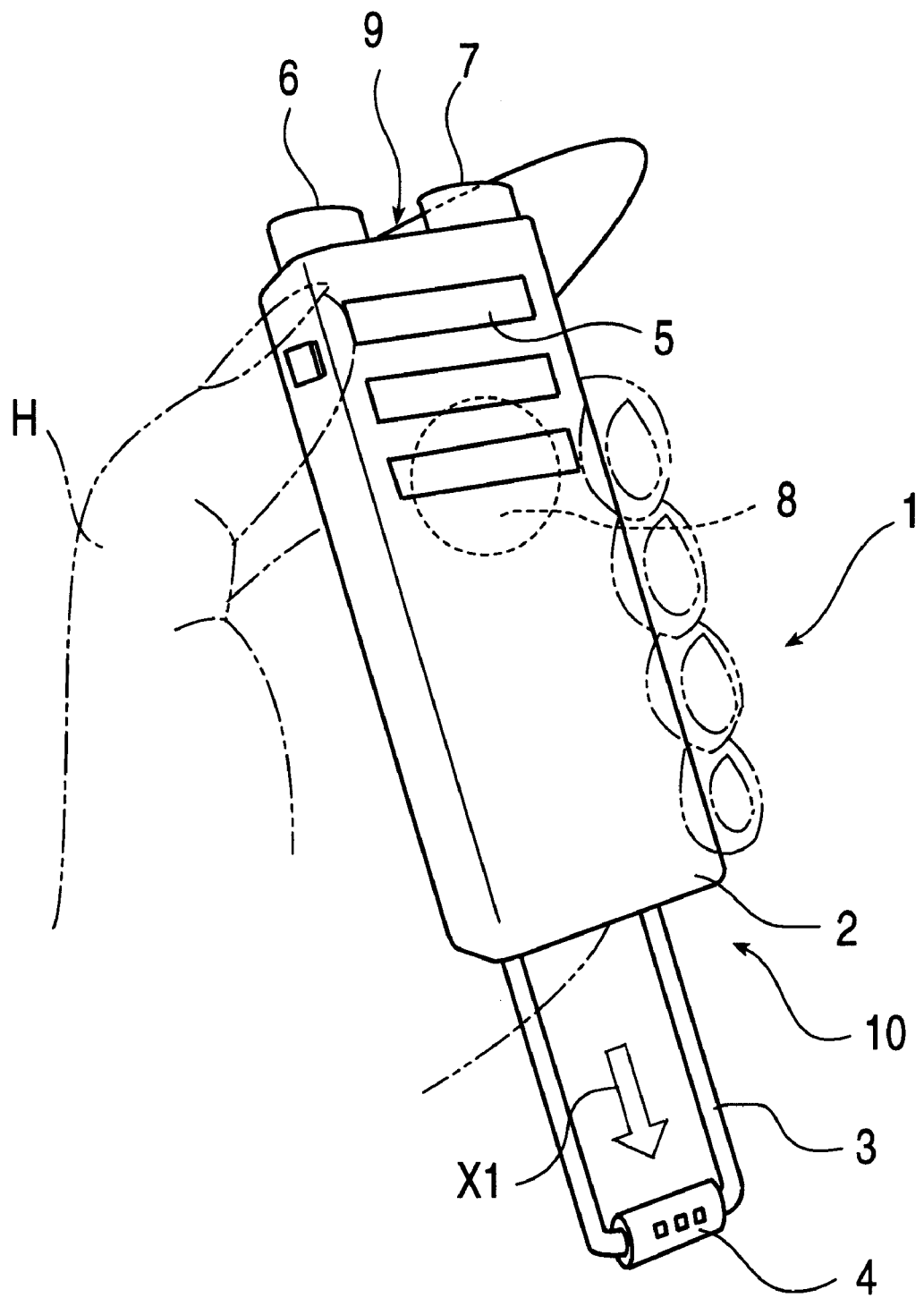
FIG. 2 is a perspective view illustrating the mobile communication unit shown in FIG. 1 ready for use in a state in which the antenna and the microphone pop out of the main unit.

FIG. 1 illustrates a mobile cellular telephone used as a mobile communication unit according to an embodiment of the present invention. In FIGS. 1 and 2, a mobile cellular telephone generally indicated by 1 has a main unit 2, an antenna 3 and a microphone 4, which serves as a sound receiver. FIG. 1 illustrates the mobile cellular telephone 1 in a state in which the antenna 3 and the microphone 4 are accommodated in the main unit 2. FIG. 2 illustrates the mobile cellular telephone 1 in a state in which the antenna 3 and the microphone 4 are pulled out of the main unit 2 to perform a transmitting or receiving operation.

The main unit 2 has a display section 5 and operating sections 6 and 7. The display section 5 is able to display a variety of information, such as telephone numbers and various functions stored in a memory within the main unit 2. The display section 5 is formed of, for example, a liquid crystal display device.

The operating sections 6 and 7 are operated to read information stored in the memory within the main unit 2 and to implement various functions for the transmitting or receiving operation. The operating sections 6 and 7 are positioned on the upper part of the main unit 2, and a speaker 8 is located somewhat below the display section 5.

The main unit 2 is an elongated case which is configured to be easily portable in a hand H of the user shown in FIGS. 1 and 2. The main unit 2, which is made of plastic, for example, is adequate to accommodate the antenna 3 and the microphone 4 therein.

Figure 3:
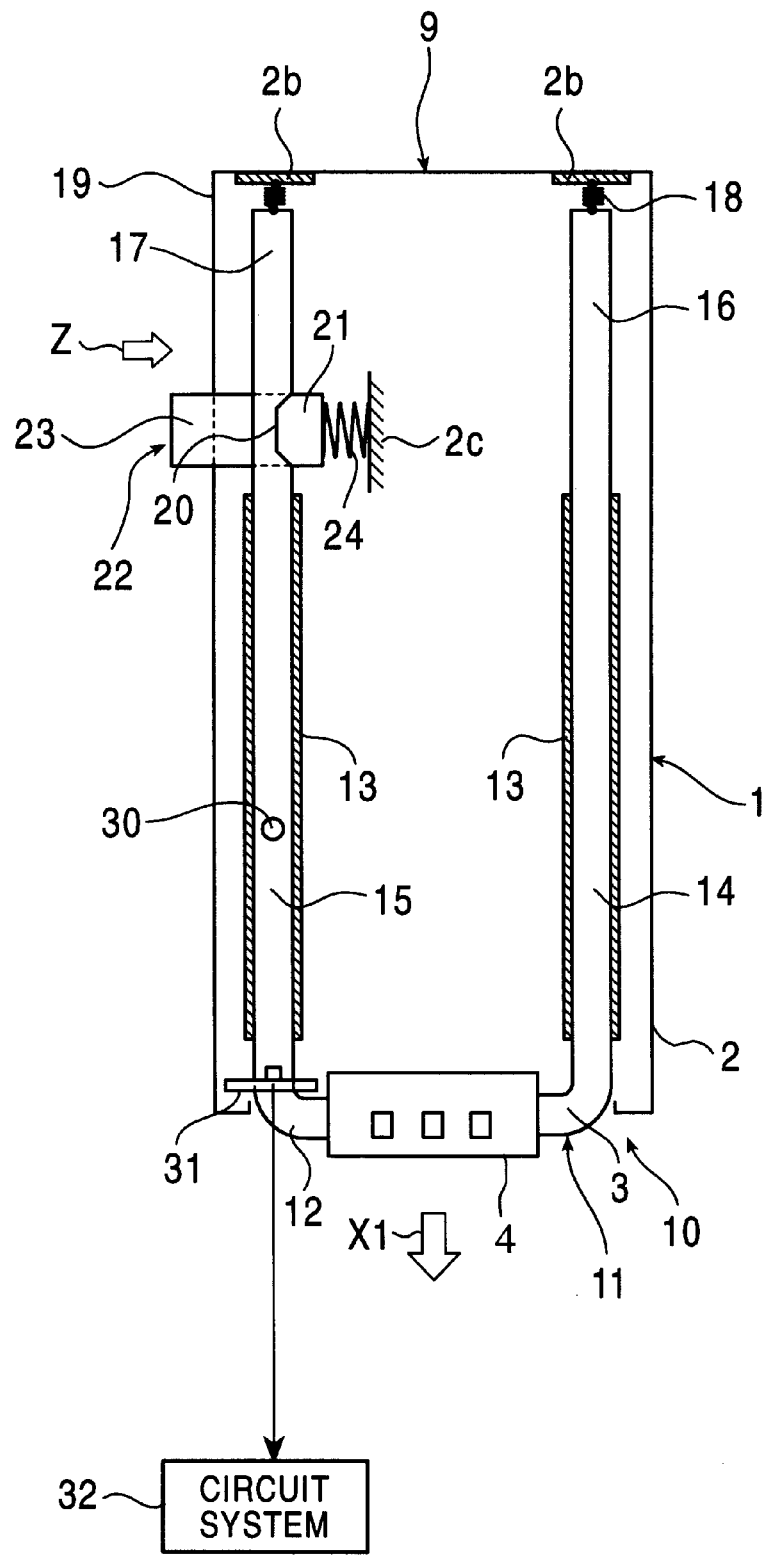
FIG. 3, corresponding to FIG. 1, illustrates the internal configuration of the mobile communication unit in the state in which the antenna and the microphone are accommodated within the main unit.
Figure 4:
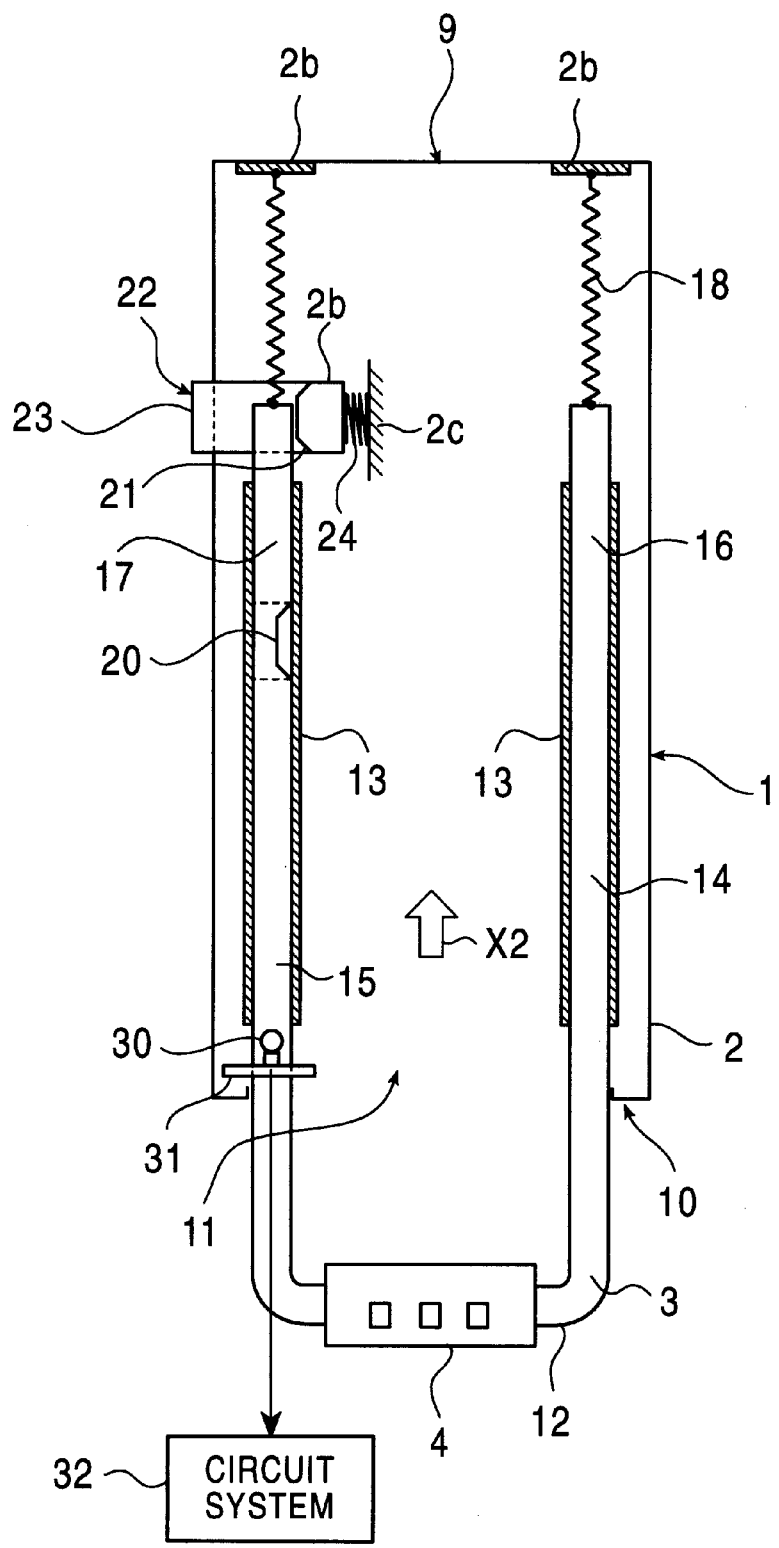
FIG. 4, corresponding to FIG. 2, illustrates the internal configuration of the mobile communication unit ready for use in the state in which the antenna and the microphone pop out of the main unit.

FIGS. 3 and 4 illustrate examples of the internal configuration of the main unit 2 in correspondence with FIGS. 1 and 2, respectively. An upper part 9 of the main unit 2 is positioned at the upper part of FIGS. 3 and 4, while a lower part 10 of the main unit 2 is located at the lower part of FIGS. 3 and 4. The lower part 10 of the main unit 2 has an opening 11 through which the above-described antenna 3 and the microphone 4 are pushed out from and retracted into the main unit 2.

The antenna 3 is formed generally in a U shape, and the microphone 4 is fixed to the center part 12 of the antenna 3. An integral structure of the microphone 4 and the antenna 3 can be pushed out from the main unit 2 in the direction indicated by the arrow X1 shown in FIG. 3, and they can be retracted into the main unit 2 in the direction indicated by the arrow X2 illustrated in FIG. 4.

Figure 5:
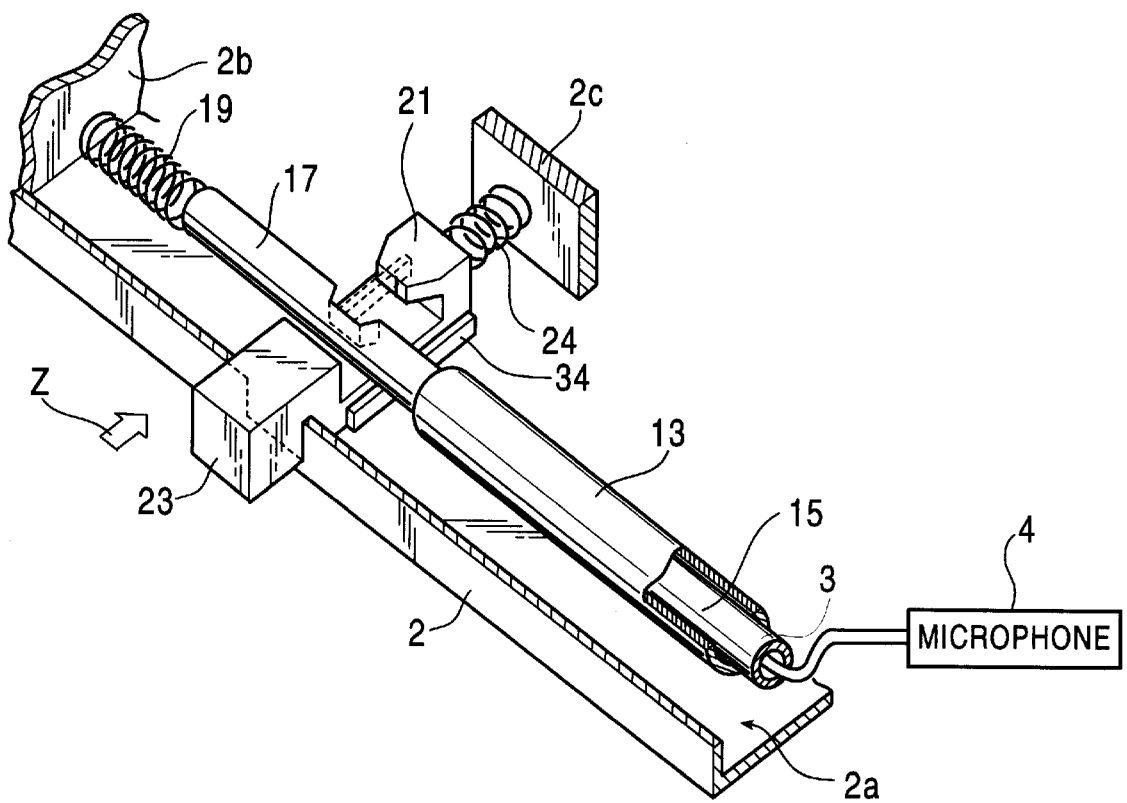
FIG. 5 illustrates an example of guides and a fixing member used for the antenna of the mobile communication unit shown in FIG. 1.

The structure of the mobile cellular telephone 1 in which the antenna 3 and the microphone 4 are accommodated within the main unit 2 will now be explained with reference to FIGS. 3 through 5.

In the main unit 2, guides 13, 13 are fixed parallel to each other in the longitudinal direction of the main unit 2, i.e., in the directions X1 and X2. The guides 13, 13 are adapted to linearly guide parallel portions 14 and 15, respectively, of the antenna 3. Since the parallel portions 14 and 15 are formed, for example, in a cylindrical shape, as shown in FIG. 5, the guides 13 are also formed in a cylindrical shape. The guides 13 are fixed to the inner surface 2a of the main unit 2 illustrated in FIG. 5.

A signal line for electrically connecting the microphone 4 and a circuit system 32 is provided in a hollow portion of the antenna 3. This makes it possible to transmit electronic signals from the microphone 4 attached to the antenna 3 to the circuit system 32 disposed within the main unit 2.

Springs 18 and 19 are respectively provided between upper sections 16 and 17 of the parallel portions 14 and 15 and stationary portions 2b, 2b of the main unit 2. The springs 18 and 19 are adapted to urge the antenna 3 in the direction X1. A notch 20, which serves as a recessed portion for receiving a fixing member 21, is disposed somewhere in a range within the parallel portion 15 and in the vicinity of the upper section 17.

The fixing member 21 fixes elements to be contained, i.e., the microphone 4 and the antenna 3, within the main unit 2. A release member 22 having a release button 23 and a spring 24 is also provided. The fixing member 21 is integrally formed with the release button 23 of the release member 22. The spring 24 is located between the fixing member 21 and a stationary portion 2c of the main unit 2. The user presses the release button 23, as illustrated in FIG. 1, with a his/her 50 in the direction indicated by the arrow Z shown in FIG. 3 so as to disengage the fixing member 21 from the notch 20 against the urging force of the spring 24. This triggers the antenna 3 and the microphone 4 to pop out of the main unit 2, as illustrated in FIGS. 2 and 4, in the direction X1 by the urging force of the springs 18 and 19. The release button 23 is guided by the guide 34, as shown in FIG. 5, in the direction Z and in the reverse direction.

A switching projection 30 is located somewhere in a range within the parallel portion 15. A switch 31 is provided in the vicinity of the opening 11 of the main unit 2 in correspondence with the parallel portion 15. When the antenna 3 and the microphone 4 pop out in the direction Xl, as illustrated in FIG. 4, the projection 30 turns on the switch 31 to cause the circuit system 32 within the main unit 2 to enter the communicating mode, i.e., the mobile telephone 1 is set off hook (the handset of an ordinary cable telephone is lifted). Alternatively, when the projection 30 turns on the switch 31, the power supply of the circuit system 32 may be actuated, i.e., the power supply of the mobile cellular telephone 1 may be switched on.

Figure 6:
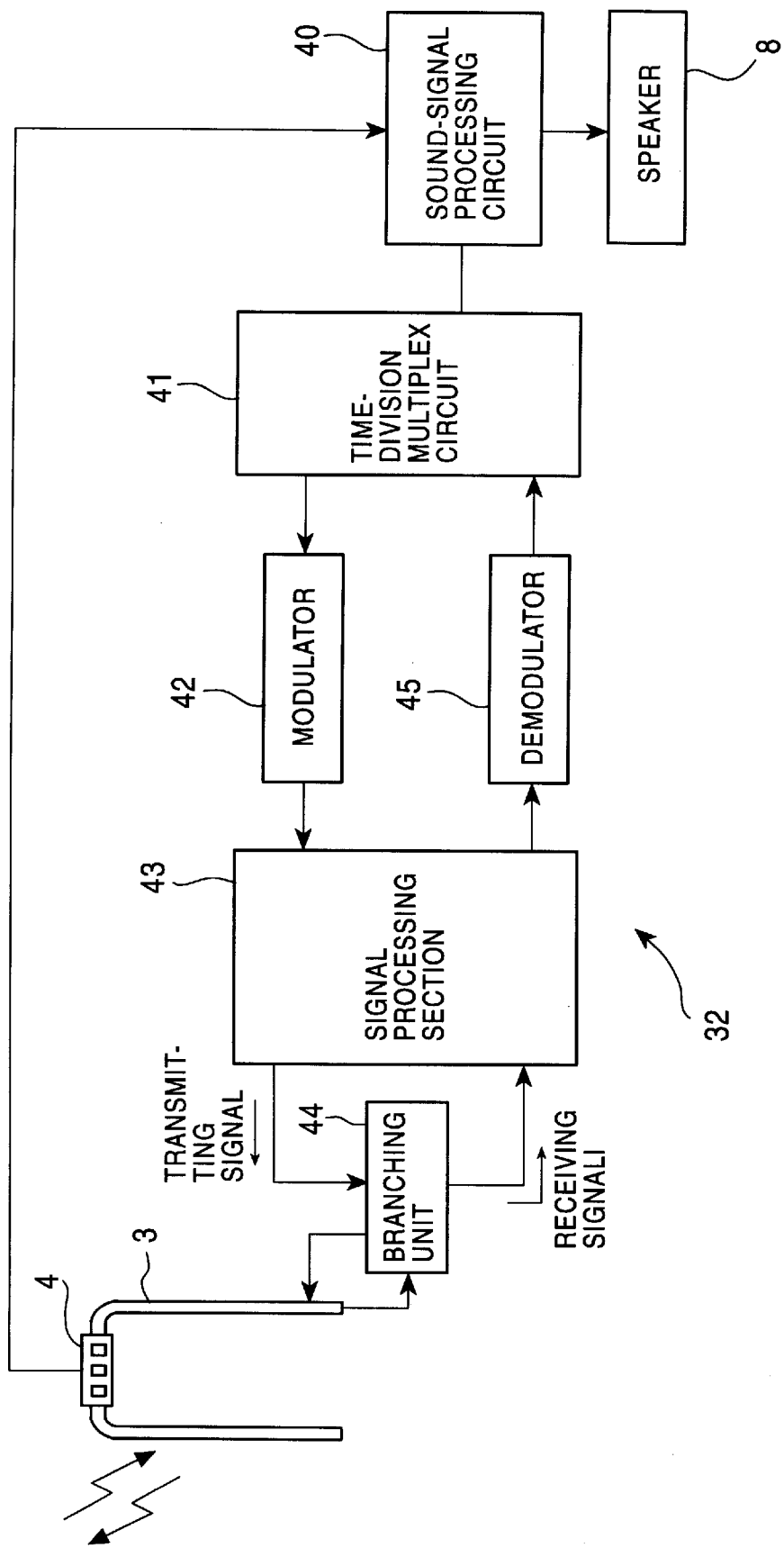
FIG. 6 is a block diagram illustrating the circuit system of the mobile communication unit shown in FIG. 1.

FIG. 6 illustrates an example of the configuration of the above-described circuit system 32 together with the antenna 3, the microphone 4, and the speaker 8. In FIG. 6, a sound signal received by the microphone 4 passes through a sound-signal processing circuit 40 and a time-division multiplex circuit 41 and is then modulated by a modulator 42. The modulated signal is then transmitted to a signal processing section 43 in which the signal is converted into an RF signal and passes through an RF filter. The signal is further amplified and passes through a filter contained in a branching unit 44 in which the transmitting frequency is used as the pass band. The radio wave is thus transmitted from the antenna 3. The branching unit generally contains two types of filters, a first filter in which the transmitting frequency is used as the pass band and a second type of filter in which the receiving frequency is used as the pass band.

In contrast, a receiving wave received by the antenna 3 is transmitted to the branching unit 44 in which the receiving frequency is extracted. The receiving signal is further supplied to an RF filter of the signal processing section 43 in which the signal components in the bands other than the receiving frequency are removed. Subsequently, the signal processing section 43 extracts a signal of a given channel by using a predetermined filter. The extracted signal is then demodulated by a demodulator 45 and passes through the time-division multiplex circuit 41 and is further processed in the sound-signal processing section 40. The processed signal is then output from the speaker 8 as a sound.

The operation of the mobile cellular telephone 1 configured as described above is as follows. The user holds the mobile cellular telephone 1 with his/her hand H, as shown in FIG. 1, and presses the release button 23 with a thumb 50 in the Z direction. This causes the release button 23 to shift in the Z direction from the state shown in FIG. 3 to the state shown in FIG. 4 while resisting the urging force of the spring 24. The fixing member 21 is thus disengaged from the notch 20 of the antenna 3 so as to allow the antenna 3 to pop out of the main unit 2 in the direction X1 by the urging force of the springs 18 and 19. In thrusting out the antenna 3 in the direction X1 in the above manner, the guides 13, 13 linearly guide the parallel portions 14 and 15, respectively, of the antenna 3, thereby making it possible to smoothly and promptly push the antenna 3 out of the main unit 2. The switching projection 30 presses the switch 31, as illustrated in FIG. 4, to cause the circuit system 32 to enter the communicating mode.

Since the antenna 3 and the microphone 4 integrally pop out of the main unit 2, as shown in FIG. 4, the telephone 1 is ready for use immediately, as illustrated in FIG. 2, in which the antenna 3 and the microphone 4 project from the main unit 2 in the direction X. The length by which the antenna 3 projects from the main unit 2 can be set to such a degree as to make the best use of the transmitting and receiving effects of the antenna 3.

In this manner, in order to use the mobile cellular telephone 1, as in the state shown in FIGS. 2 and 4, from the state in which the antenna 3 and the microphone 4 are stored in the main unit 2 when not in use, as illustrated in FIGS. 1 and 3, it is only essential that the user presses the release button 23 with his/her finger or thumb to cause the antenna 3 and the microphone 4 to slide and pop out of the main unit 2 in the direction X1. At the same time, the mobile cellular telephone 1 enters the communicating mode and is ready for use.

When the user has finished the conversation on the mobile telephone 1, he/she returns the telephone 1 from the state shown in FIG. 4 to the state shown in FIG. 3. More specifically, the user pushes back the antenna 3 in the direction X2 to cause the fixing member 21 to fit into the notch 20 of the antenna 3, as illustrated in FIG. 3. Accordingly, the antenna 3 can be held within the main unit 2 against the pressing force of the springs 18 and 19.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims.

In the foregoing embodiment, the mobile cellular telephone is used as a mobile communication unit. The present invention is not, however, limited to the above type of communication unit. The other types of communication terminals, such as simple mobile telephones, and communication units, such as ham radio transceivers and business-oriented radio transceivers, may use the present invention.

Moreover, although the antenna is formed generally in a U shape in the foregoing embodiment, it may be formed linearly or in another shape. Additionally, although the microphone is fixed at the forward end of the antenna in the foregoing embodiment, it may be fixed at any position of the antenna and in any manner.

Further, in the foregoing embodiment, the user presses the release button 23 to cause the antenna 3 and the microphone 4 to slide and pop out of the main unit 2 in the direction X1 shown in FIG. 3 by the elasticity of the springs 18 and 19. However, the provision of the springs 18 and 19 may be omitted, and the user manually pull the antenna 3 and the microphone 4 from the main unit 2 by using his/her hands.

In the foregoing embodiment, the sound receiver (microphone) is accommodated within the main unit of the mobile cellular telephone when not in use. When in use, however, the sound receiver is adapted to pop out of the main unit by the user's operation and to receive sound. The antenna is also accommodated within the main unit when not in use. When communications are made, however, the antenna is pushed out of the unit, together with the sound receiver, by the user's operation and transmits and receives signals. Since the sound receiver and the antenna are integrally formed, they can be simultaneously thrust out of the main unit by the user's operation. When not in use, both antenna and sound receiver are accommodated within the main unit, thereby achieving miniaturization of the mobile communication unit.

In the foregoing embodiment, the sound receiver is attached to the generally U-shaped antenna, and the forward end of the antenna is positioned within the main unit when the telephone is not in use. It is thus possible to increase the durability of the antenna and also to reduce the size of the mobile communication unit.

Additionally, in the foregoing embodiment, the mobile communication unit contains a controller that is able to cause the circuit system to enter the communicating mode when the antenna and the sound receiver pop out of the main unit. At the same time, the telephone is ready for use.

As is seen from the foregoing description, the present invention offers the advantages of miniaturizing the mobile communication unit and increasing the durability of the antenna. Additionally, the telephone is ready for use immediately upon the user's operation.

What is claimed is:

1. A mobile communication unit comprising:

a main unit;

an antenna being substantially U-shaped having two parallel arms and a connecting portion and being formed as a hollow tube for transmitting and receiving signals while being supported at both ends thereof by said main unit, said antenna residing inside said main unit in a retracted position;

a pair of springs arranged between an inner surface of said main unit and ends of said two parallel arms opposite said connecting portion for urging said antenna into a position extending outside of said main unit in an extended position;

a release mechanism for releasing said antenna in said retracted position, whereby said pair of springs urge said antenna to move automatically to said extended position; and a microphone attached to said connecting portion of said antenna for receiving sound in said extended position.

2. The mobile communication unit according to claim 1, wherein said main unit includes a control circuit for performing communications, and said microphone is electrically connected to said control circuit via a conductor arranged inside said hollow tube forming said antenna.

3. The mobile unit according to claim 1, wherein said main unit includes a pair of guides for guiding said two parallel arms of said antenna to slide in a longitudinal direction of said main unit when said antenna moves from said retracted position to said extended position.

4. The mobile communication unit according to claim 3, wherein said main unit further includes control means for causing said mobile communication unit to enter a communicating state when said antenna slides to said extended position.

5. The mobile communication unit according to claim 4, wherein said mobile communication unit is in an off hook condition in said communicating state.

6. The mobile communication unit according to claim 4, wherein said main unit further includes a power supply source, and said power supply source is turned on in said communicating state.

* * * * *